INVENTORS
WILLIAM M. CHALMERS
& FRANKLIN B. EASTON
BY
RICHEY, WATTS, EDGERTON & McNENNY

ATTORNEYS

Dec. 23, 1958   W. M. CHALMERS ET AL   2,865,649
TANDEM AXLE WHEEL SUSPENSION FOR AUTOMOTIVE VEHICLES
Filed Dec. 5, 1956   4 Sheets-Sheet 4

INVENTORS
WILLIAM M. CHALMERS,
& FRANKLIN B. EASTON
BY
RICHEY, WATTS, EDGERTON & McNENNY
ATTORNEYS

United States Patent Office 2,865,649
Patented Dec. 23, 1958

2,865,649

TANDEM AXLE WHEEL SUSPENSION FOR AUTOMOTIVE VEHICLES

William M. Chalmers, Niles, and Franklin B. Easton, Salem, Ohio, assignors to Youngstown Steel Car Corporation, Niles, Ohio, a corporation of Ohio Application December 5, 1956, Serial No. 626,498

6 Claims. (Cl. 280—104.5)

This invention relates broadly to pneumatic air spring suspension assemblies for single or tandem axle vehicles, and more specifically to the arrangement of the air cells that support the verhicle body, and a sub-frame therefor which is designed to control the compressive loads imposed on the air cells and stabilize the body carried thereby.

One of the objects of the invention is to provide a pneumatic suspension for a tandem axle vehicle which embodies separate air cells mounted over each wheel in the axle assembly.

Other objects of the invention reside in the provision of a stabilizing mechanism for use with the improved air cell structure and a sub-frame assembly designed to restrain side sway of the body, resist inertia forces following the application of the brakes, maintain tracking alignment of the wheels during operation of the vehicle and equalize the compressive loads imposed upon the air cells when the body of the vehicle is improperly loaded or operated on crowded highways.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
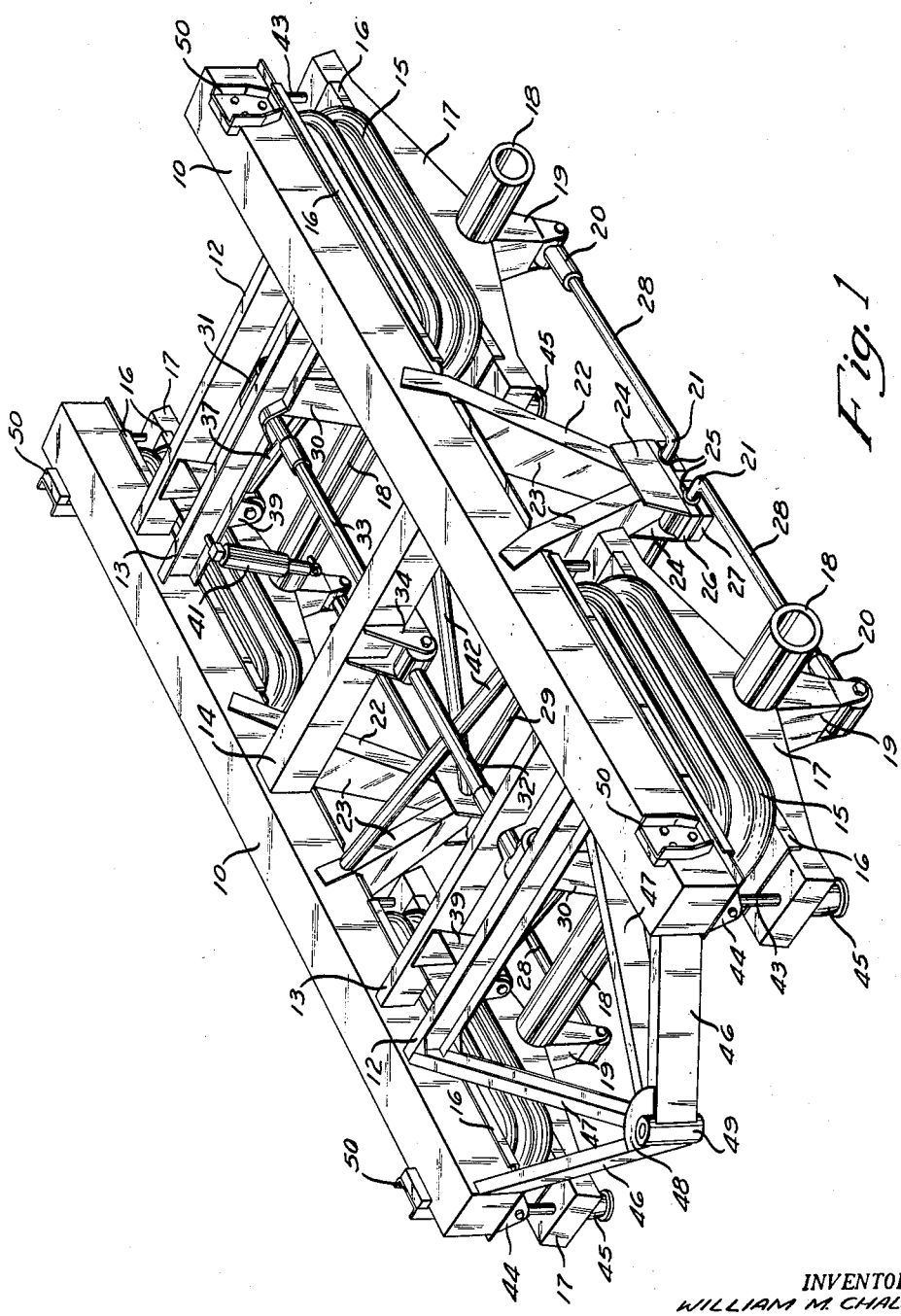
Fig. 1 is a view in perspective of the improved undercarriage for the pneumatic suspension assembly.
Figure 2:
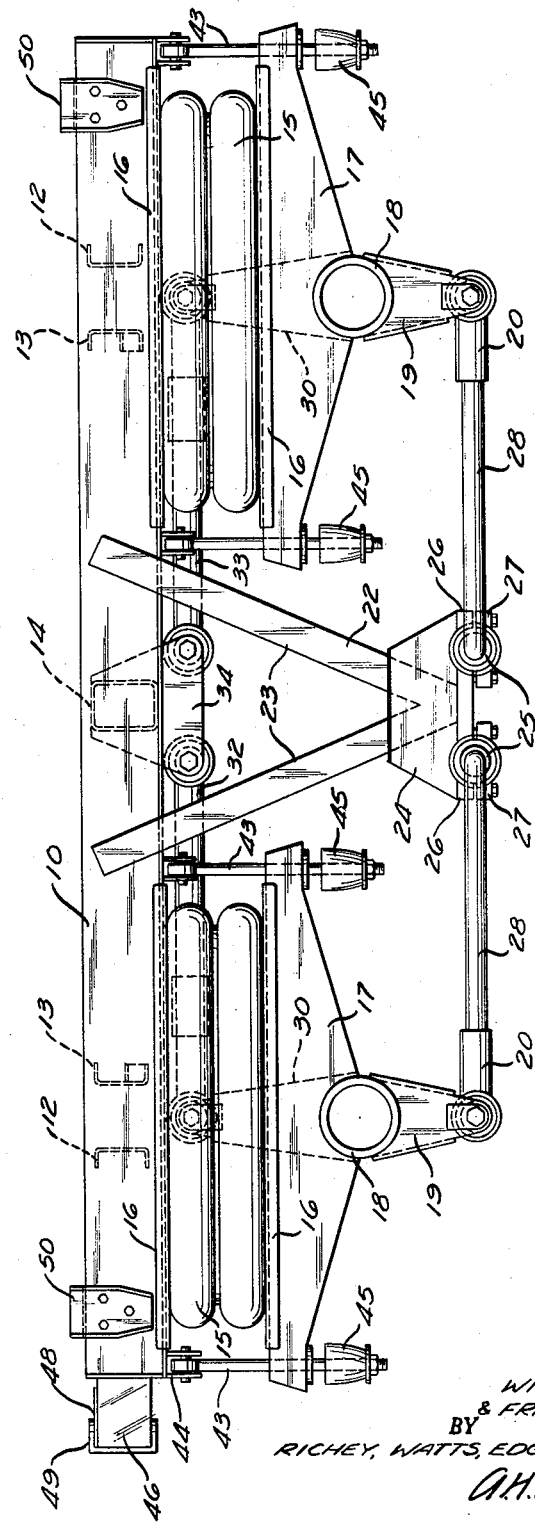
Fig. 2 is a side elevational view thereof.
Figure 3:
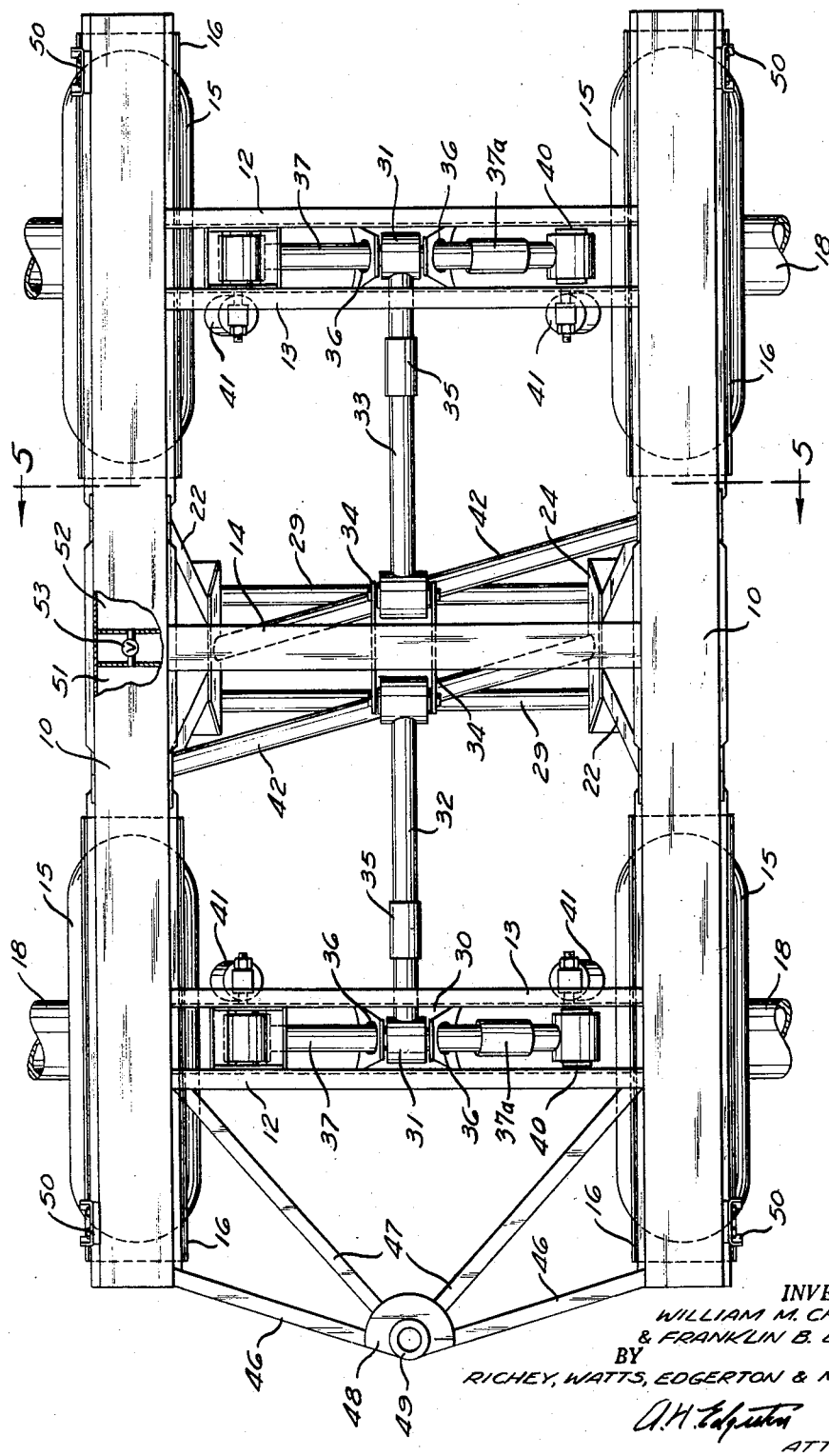
Fig. 3 is a plan view of the undercarriage.
Figure 4:
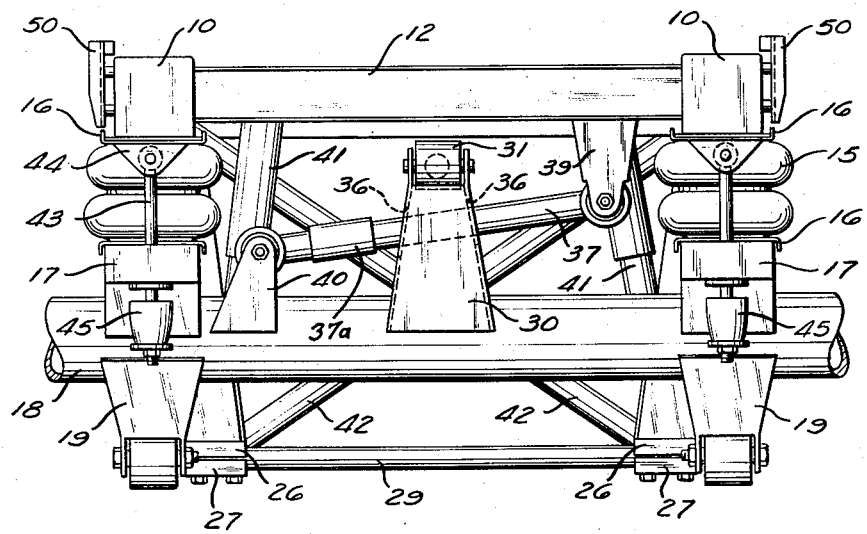
Fig. 4 is a rear elevational view.
Figure 5:
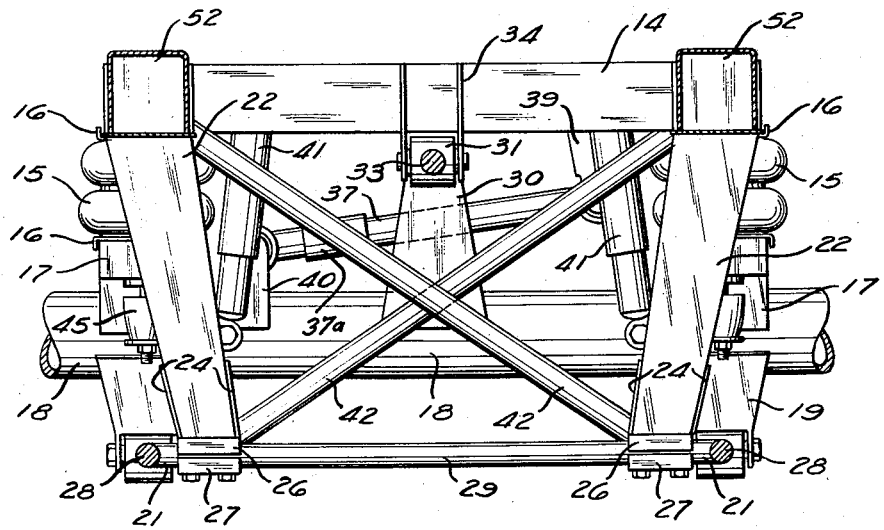
Fig. 5 is a sectional view taken on a plane indicated by the line 5—5 in Fig. 3.

Referring first to Fig. 1, the pneumatic spring suspension comprises an undercarriage or sub-frame embodying a pair of parallel hollow chassis beams 10 of rectangular cross section for the support of the sills of the vehicle body. The beams are united adjacent their outer ends by spaced channel irons 12 and 13 and by a central rectangular beam 14. The forward and rearward ends of each beam 10 are supported by elongated rubber air cells 15 having shallow channel irons 16 vulcanized upon the upper and lower faces thereof which are engaged respectively with the beams 10 and with fabricated sheet metal bolsters 17 welded respectively to the dual axles 18 adjacent the ends thereof. The axles have subtended brackets 19 welded thereon below the bolsters 17, the free ends of the brackets being bifurcated and cross drilled for the pivotal support of couplings 20 telescopically engaged with the ends of torsion rods 21. Each beam 10 has a truss 22 depending from the center thereof, the truss comprising a pair of convergent fabricated steel struts 23 united at their lower ends by a gusset plate 24 which retains a pair of pillow blocks 26 and 27. The torsion rods 21 are formed of spring steel and embody forwardly directed side arms 28 parallel the beams 10 and integral transverse sections 29 parallel the cross beam 14. The ends of the forward side arms 28 are threaded and connected to the couplings 20 and the rearward side arms are similarly connected to the rearward coupling 20. The inner ends of the side arms 28 of the torsion rods are supported in cylindrical rubber sleeves 25 clamped in the pillow blocks 26 and 27. The axles 18 are provided with central vertically disposed brackets 30 which support pivotal couplings 31 engaged respectively with a forward rod 32 and rearward rod 33. The inner ends of each of the rods 32 and 33 are enlarged and drilled to retain pins mounted in a bracket 34 subtended from the center of the beam 14. The rods 32 and 33 are provided with threaded sleeves 35 intermediate their ends to accommodate lineal adjustment thereof. The brackets 30 are fabricated with elongated openings 36 in the central portion thereof to facilitate vertical movement of sway or tracking bars 37 which pass therethrough. The sway bars 37 are pivotally supported in brackets 39 depending from the channel irons 12 and 13 adjacent the right-hand beam 10 and vertical brackets 40 welded to the upper face of the left-hand side of the axles 18. The sway bars 37 are normally inclined downwardly from the right-hand bracket 39 to the bracket 40 on the left-hand side of the axle. Threaded sleeves 37a are provided on the sway bars to facilitate lineal adjustment thereof. Road shocks transmitted to the beams are dampened by the air cells 15 and further restricted by shock absorbers 41 connected to the channel irons 13 and the axles 18.

The truss 22 on each beam 10 is braced to resist lateral movement by tubular diagonal cross members 42, each welded at one end to the upper ends of the struts 23, and at their lower ends to the gusset plates 24 and the pillow blocks 26.

The bolsters 17 are distilled adjacent the ends thereof to receive snubber bars 43 pivotally supported in brackets 44 affixed upon the lower faces of the beams 10. The bars 43 slide freely through the openings in the bolsters and the ends thereof are provided with rubber buffer blocks 45 retained by washers and nuts threaded on the rods 43. The snubbers are provided to restrain excessive vertical movement of the air cells 15.

The forward end of the undercarriage is framed with a draw bar connection embodying convergent channels 46 and 47 welded to the beams 10 and to a semicircular gusset plate 48. The gusset plate is disposed in the medial axis of the undercarriage and is formed with a cylindrical thimble 49 in the center of the forward end thereof. The draw bar is provided for vehicles of the type that employ a king pin coupling between the body and the undercarriage. When the body is mounted for lineal sliding adjustment, clamping plates 50 having inturned lugs on the upper ends thereof are bolted to the outer faces of the beams 10 with the lugs thereof engaged with the body.

The beams 10 are formed of fabricated sheet steel plates, the side and end members thereof being welded to form air tight chambers constituting surge tanks for the air cells 15. The surge tanks are provide with internal baffle plates to restrain the free circulation of air therethrough, and each beam has a partition in the center thereof to form front and rear chambers 51 and 52 communicating respectively with the subjacent air cells. The forward and rear chamber in each beam are interconnected by a valve 53 to control the passage of air therethrough. As illustrated, the air cells are formed of elongated oval bodies vulcanized together in superposed position relation throughout their length to form a pair of chambers of oval transverse section. Each chamber is connected to the superjacent surge tank through conduits (not shown) having valves therein to equalize the flexure thereof.

The present invention constitutes a material advance in the art over the spring suspension heretofore in use.

In contrast, steel leaf springs have a low rate of movement under light loading with an ascending rate to take full load and impact loading caused by uneven road surfaces. In a pneumatic suspension or air spring, a height control valve is employed to keep the carrying height the same regardless of load. The air spring will support appreciable loads in compression, but the braking torque, braking thrust, laterally applied thrust, incident changes in direction of movement of the vehicle, must be taken through control mechanism in the pneumatic suspension undercarriage. In addition, control of the body roll may require mechanism to limit the separation of the axle from the frame. The undercarriage, described above, assures the stabilization of the vehicle and prevents undue movements of the body, and/or load therein under the inertia forces imposed upon the vehicle by the causes enumerated above. The vertical depression of one of the four air cells 15 is restrained primarily by the resistance offered by the flexure of the arms 28 and the torsion of the central section 29 thereof. The depression of the air cells above a common axle, is restrained by the combined action of the bars 32 or 33, torsion bars 21 and the shock absorbers 41. Longitudinal movement of the body, consequent application of the brakes, is restrained by the bars 32 and 33. The truss members 22 are supported in normal relation with the beams 10 by the diagonal cross bars 42 which prevent side sway, and excessive rebound is limited by the snubbers 45 in the end portions of the bolsters 17. It is therefore apparent that the improved undercarriage will preserve all of the advantages of an air spring, and at the same time, safeguard the deleterious reaction imposed thereon including excessive side loading of the body.

The undercarriage, illustrated herein, contemplates the structure of a dual axle trailer. It is to be understood, however, that "live" axles having power driven spindles therein may be substituted for the axles 18 without departing from the scope or spirit of the appended claims. It will be further understood that the bolsters 17 may be closed and formed with chambers therein in substitution for the surge tanks formed in the beams 10, and that such substitution is contemplated herein. The undercarriage illustrated herein, is symmetrical about its transverse center line and may be utilized as a support for a single axle vehicle by omission of the portion thereof forward the center truss 22.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A pneumatic air spring suspension for a vehicle comprising a pair of parallel axles, bolsters affixed thereon in normal relation thereto, chassis beams superjacent said bolsters and parallel thereto, air cells carried by said bolsters and supporting the ends of said beams, brackets subtended from said axles in normal relation thereto, truss members depending from said beams intermediate said air cells, pillow blocks on the free ends thereof and U-shaped torsion rods seated in said pillow blocks, the ends thereof being pivotally connected to said brackets, a cross beam intermediate said chassis beams, a bracket subtended therefrom, vertical arms on said axles in the center thereof, and links pivotally connected to said bracket and said arms, chassis cross members intermediate said beams parallel to said cross beam, second brackets depending therefrom adjacent one of said beams, second vertical arms on said axles adjacent one end thereof, tie rods pivotally connected to said second arms and said second brackets and snubbers pivotally connected to said axles and said chassis cross members superjacent said second vertical arms.

2. A pneumatic air spring suspension for a vehicle comprising a pair of parallel axles, bolsters affixed thereon in normal relation thereto, chassis beams superjacent said bolsters and parallel thereto, air cells carried by said bolsters and supporting the ends of said beams, brackets subtended from said axles in normal relation thereto, truss members depending from said beams intermediate said air cells, pillow blocks on the free ends thereof and U-shaped torsion rods seated in said pillow blocks, the ends thereof being pivotally connected to said brackets, a cross beam intermediate said chassis beams, a bracket subtended therefrom, vertical arms on said axles in the center thereof, and links pivotally connected to said bracket and said arms, chassis cross members intermediate said beams parallel to said cross beam, second brackets depending therefrom adjacent one of said beams, second vertical arms on said axles adjacent one end thereof, tie rods pivotally connected to said second arms and said second brackets, snubbers pivotally connected to said axles and said chassis cross members superjacent said second vertical arms, and diagonal cross braces connected to said beams and to the truss members adjacent the free ends thereof.

3. A pneumatic air spring suspension for a vehicle comprising a pair of parallel axles, bolsters affixed thereon in normal relation thereto, chassis beams superjacent said bolsters and parallel thereto, air cells carried by said bolsters and supporting the ends of said beams, brackets subtended from said axles in normal relation thereto, truss members depending from said beams intermediate said air cells, pillow blocks on the free ends thereof and U-shaped torsion rods seated in said pillow blocks, the ends thereof being pivotally connected to said brackets, and rebound snubber rods intermediate said beams and each end of said bolsters, and rubber buffer blocks on said rods.

4. A pneumatic air spring suspension for a vehicle comprising a pair of parallel axles, bolsters affixed thereon in normal relation thereto, chassis beams superjacent said bolsters and parallel thereto, air cells carried by said bolsters and supporting the ends of said beams, brackets subtended from said axles in normal relation thereto, truss members depending from said beams intermediate said air cells, pillow blocks on the free ends thereof and U-shaped torsion rods seated in said pillow blocks, the ends thereof being pivotally connected to said brackets, a cross beam intermediate said chassis beams, a bracket subtended therefrom, vertical arms on said axles in the center thereof, an opening therein, links pivotally connected to said bracket and said arms, second cross members intermediate said chassis beams above said axles, brackets depending therefrom, second vertical arms on said axles adjacent an end thereof, and sway bars pivoted thereto and to said brackets depending from said second cross members and passing through said opening in said first named vertical arms on said axles.

5. A pneumatic air spring suspension for a vehicle comprising a pair of parallel axles, bolsters affixed thereon in normal relation thereto, chassis beams superjacent said bolsters and parallel thereto, air cells carried by said bolsters and supporting the ends of said beams, brackets affixed to said axles subjacent said bolsters and normal thereto, truss members subtended from the center of said beams, pillow blocks on the free ends of said truss members, U-shaped torsion rods in said pillow blocks pivoted at their ends to said brackets, brackets depending from said beams superjacent the ends of said bolsters and snubber bars pivoted in said brackets and slidably engaged with the ends of said bolsters, whereby said torsion rods will restrain lateral flexure of said air cells, and said snubber bars will restrain vertical flexure thereof.

6. A pneumatic air spring suspension for a vehicle comprising a pair of parallel axles, bolsters affixed thereon in normal relation thereto, chassis beams superjacent said bolsters and parallel thereto, air cells carried by said bolsters and supporting the ends of said beams, brackets subtended from said axles in normal relation thereto, truss members depending from said beams intermediate said air cells, pillow blocks on the free ends thereof and U-shaped torsion rods seated in said pillow blocks, the ends thereof being pivotally connected to said brackets, a cross beam intermediate said chassis beams, a bracket subtended therefrom, vertical arms on said axles in the center thereof, an opening therein, links pivotally connected to said bracket and said arms, threaded sleeves on said links to facilitate lineal adjustment thereof, second cross members intermediate said chassis beams above said axles, brackets depending therefrom, second vertical arms on said axles adjacent an end thereof, sway bars pivoted thereto and to said brackets depending from said second cross members and passing through said opening in said first named vertical arms on said axles, and threaded sleeves on said sway bars to facilitate lineal adjustment thereof.

References Cited in the file of this patent

UNITED STATES PATENTS

| | | |
|---|---|---|
| 2,078,521 | Alden | Apr. 27, 1937 |
| 2,290,620 | Brown | July 21, 1942 |
| 2,663,569 | Gouirand | Dec. 22, 1953 |
| 2,691,420 | Fox | Oct. 12, 1954 |
| 2,754,111 | Norrie | July 10, 1956 |
| 2,772,912 | Neff | Dec. 4, 1956 |
| 2,787,475 | Jackson | Apr. 2, 1957 |
| 2,790,634 | Fawick | Apr. 30, 1957 |

UNITED STATES PATENT OFFICE
CERTIFICATE OF CORRECTION

December 23, 1958

Patent No. 2,865,649

William M. Chalmers et al.

It is hereby certified that error appears in the printed specification of the above numbered patent requiring correction and that the said Letters Patent should read as corrected below.

Column 1, line 18, for "verhicle" read -- vehicle --; column 2, line 34, for "distilled" read -- drilled --; line 56, for "provide" read -- provided --.

Signed and sealed this 12th day of May 1959.

(SEAL)
Attest:

KARL H. AXLINE
Attesting Officer

ROBERT C. WATSON
Commissioner of Patents